US011214679B2

(12) United States Patent
Guha et al.

(10) Patent No.: US 11,214,679 B2
(45) Date of Patent: Jan. 4, 2022

(54) HIGH STRENGTH SHEET MOLDING COMPOSITION FORMED WITH AN INTERPENETRATING POLYMER NETWORK

(71) Applicant: Continental Structural Plastics, Inc., Auburn Hills, MI (US)

(72) Inventors: Probir Kumar Guha, Bloomfield Hills, MI (US); Michael J. Hiltunen, Rochester, MI (US); Shane Skop, Auburn Hills, MI (US)

(73) Assignee: CONTINENTAL STRUCTURAL PLASTICS, INC., Auburn Hills, MI (US)

(*) Notice: Subject to any disclaimer, the term of this patent is extended or adjusted under 35 U.S.C. 154(b) by 129 days.

(21) Appl. No.: 16/092,548

(22) PCT Filed: Apr. 19, 2017

(86) PCT No.: PCT/US2017/028406
§ 371 (c)(1),
(2) Date: Oct. 10, 2018

(87) PCT Pub. No.: WO2017/184761
PCT Pub. Date: Oct. 26, 2017

(65) Prior Publication Data
US 2019/0119488 A1 Apr. 25, 2019

Related U.S. Application Data

(60) Provisional application No. 62/325,303, filed on Apr. 20, 2016.

(51) Int. Cl.
C08L 67/00 (2006.01)
C08L 67/06 (2006.01)
C08K 9/00 (2006.01)
C08K 7/14 (2006.01)
C08L 75/02 (2006.01)
C08K 7/20 (2006.01)
C08K 3/22 (2006.01)
C08K 7/02 (2006.01)
C08K 7/22 (2006.01)
C08J 5/18 (2006.01)

(52) U.S. Cl.
CPC .............. C08L 67/00 (2013.01); C08J 5/18 (2013.01); C08K 3/22 (2013.01); C08K 7/02 (2013.01); C08K 7/14 (2013.01); C08K 7/20 (2013.01); C08K 7/22 (2013.01); C08K 9/00 (2013.01); C08L 67/06 (2013.01); C08L 75/02 (2013.01); C08J 2367/00 (2013.01); C08J 2475/02 (2013.01); C08K 2003/2206 (2013.01); C08K 2003/2217 (2013.01); C08K 2003/2224 (2013.01); C08K 2201/014 (2013.01); C08L 2312/00 (2013.01)

(58) Field of Classification Search
CPC ................................... C08L 67/00; C08J 5/08
See application file for complete search history.

(56) References Cited

U.S. PATENT DOCUMENTS

| 4,067,845 A | 1/1978 | Epel et al. |
| 4,073,828 A | 2/1978 | Ferrarini et al. |
| 4,232,133 A | 11/1980 | Ferrarini, Jr. et al. |
| 4,260,538 A | 4/1981 | Iseler et al. |
| 4,296,020 A | 10/1981 | Magrans, Jr. |
| 4,622,384 A | 11/1986 | Manwiller |
| 4,643,126 A | 2/1987 | Wilkinson et al. |
| 4,868,231 A | 9/1989 | Lenke et al. |
| 5,100,935 A | 3/1992 | Iseler et al. |
| 5,268,400 A | 12/1993 | Iseler et al. |
| 5,854,317 A | 12/1998 | Rinz |
| 6,759,466 B2 * | 7/2004 | Steinhausler .......... C08F 283/01 524/426 |
| 6,780,923 B2 | 8/2004 | Guha et al. |
| 7,037,865 B1 * | 5/2006 | Kimberly ................ B29C 70/60 264/103 |
| 7,524,547 B2 | 4/2009 | Beach et al. |
| 7,700,670 B2 | 4/2010 | Beach et al. |
| 7,829,637 B2 | 11/2010 | Guha et al. |
| 2005/0182205 A1 * | 8/2005 | Guha ..................... C08F 283/00 525/440.06 |
| 2007/0197694 A1 | 8/2007 | Guha et al. |

(Continued)

OTHER PUBLICATIONS

Whitney (Micro-Models for Sheet Molding Materials. Micromechanical Materials Modeling, vol. 2. 1990, p. 133).*

(Continued)

Primary Examiner — Brieann R Johnston
(74) Attorney, Agent, or Firm — Blue Filament Law PLLC

(57) ABSTRACT

A polyurea additive is provided that strengthens a given base sheet molding composition (SMC) An isocyanate containing species and an amine containing species are introduced into an uncured polymeric resin of a sheet molding compound (SMC) under conditions suitable for the formation of a polyurea polymer network. Upon cure of the SMC base resin, an interpenetrating network is formed that is stronger than the base SMC absent the polyurea. As a result, an article is formed from the SMC that is stronger at the same dimensions than a conventional article or thinned to achieve the same properties to obtain a lightweight article compared to that formed from conventional SMC. The properties of the article are also attractive relative to aluminum for the formation of vehicle body and exterior panels.

15 Claims, 3 Drawing Sheets

(56) References Cited

U.S. PATENT DOCUMENTS

2010/0204360 A1* 8/2010 Beach .................. C08K 7/20
523/223
2014/0329964 A1 11/2014 Guha et al.
2015/0376398 A1 12/2015 Guha et al.

OTHER PUBLICATIONS

Brosius (Innovation Driving Automotive SMC, 2007, 6 pages, https://www.compositesworld.com/articles/innovation-driving-automotive-smc).*

International Search Report dated Jul. 26, 2017 for International Application No. PCT/US2017/028406 filed Apr. 19, 2017.

* cited by examiner

834B 5ft/sec-14lbs

834B 4ft/sec-14lbs

Aluminum @1.5mm 5ft/sec-14lbs

Aluminum @1.5mm 4ft/sec-14lbs

HIGH STRENGTH SHEET MOLDING COMPOSITION FORMED WITH AN INTERPENETRATING POLYMER NETWORK

CROSS-REFERENCE TO RELATED APPLICATION

This application claims priority of U.S. Provisional Patent Application Ser. No. 62/325,303 filed Apr. 20, 2016, which is incorporated herein by reference.

FIELD OF THE INVENTION

The present invention generally relates to polymeric additives and in particular to a polyurea additive that strengthens a given base sheet molding composition (SMC), and in particular to lightweight articles formed from the SMC, compared to the base SMC.

BACKGROUND OF THE INVENTION

Articles formed from sheet molding compounds (SMCs) have intrinsic physical properties that are largely dictated by the inherent strength of the cured resin matrix and the interaction between the matrix and encapsulated fiber fillers such as glass. As a result, the options available to achieve higher strength in an SMC article are somewhat limited and invariably involve a combination of greater cost and greater complexity of manufacture.

Thickeners have been regularly added to sheet molding compounds (SMC) or bulk molding compounds (BMC) in order to facilitate handling and adhesion between low molecular weight polymeric resin and fiber components during mold filling. The low molecular weight polymeric resins are increased in viscosity through polymerization. Typical of these low molecular weight polymeric resins are unsaturated polyester and vinyl ester. In the case of an unsaturated polymeric resin, the addition of di- or polyfunctional species are cross-linked to form a branched network of polymer chains.

One type of thickener includes alkali earth oxides and hydroxides. Of these thickeners, magnesium oxide is the most commonly used of such thickeners. Generally, it is believed that alkali earth oxides and hydroxides form ionic bonds with functional moieties of polymeric resins present. The functional moieties illustratively include terminal carboxylate groups of polyester resins.

Diisocyanates represent another type of thickener. Diisocyanates form covalent urethane bonds with hydroxyl groups associated with polymeric resin. The inclusion of a diamine, diol, polyamine or polyol separate from the polyester resin allows thickening to occur through formation of an interpenetrating polyurea network relative to the polyester resin. While diisocyanate thickeners tend to increase viscosity rapidly and retain the viscosity over time, the material flow associated with diisocyanate thickened material within a mold is generally less than desirable. Exemplary compositions are detailed in U.S. Pat. Nos. 4,067,845; 4,073,828; 4,232,133; 4,296,020; 4,622,384; 5,100,935; and 5,268,400. Alternatively, alkali earth oxide or hydroxide thickeners tend to add viscosity more slowly and are sensitive to humidity even after ionic bond formation has occurred. Another feature of the ionic bonds formed through alkali earth oxide or hydroxide thickeners is that the bonds tend to weaken at the temperatures associated with molding thereby reducing compound viscosity and increasing material flow.

A successful prior art thickener was developed that included an isocyanate containing species and an amine containing species that were introduced into the uncured polymeric resin of a sheet molding compound or bulk molding compound under conditions suitable for the formation of a polyurea thickener. A molding compound thickened with this polyurea alone, or in combination with a conventional alkali earth oxide or hydroxide, exhibited less sensitivity to moisture and initial setup temperature as compared to conventional alkali earth oxide or hydroxide thickened molding compound systems. This thickener is detailed in U.S. Pat. No. 7,829,637 B2. This thickener showed no effect on improving the overall physical properties of the resulting cured article formed from the thickened SMC article.

It has been surprisingly discovered that by formulating an SMC composition with a variation of this thickener, that a high strength article is formed. Thus, there exists a need for a new molding compound that achieves higher strength achieved with an interpenetrating network that does not rely on inherent strength of the cured resin matrix and the interaction between the matrix and encapsulated fiber fillers.

SUMMARY OF THE INVENTION

A sheet molding composition formulation is provided that includes a thermoset cross-linkable polyester or vinyl polymeric resin, a polyurea present from between 0.6 and 8.4 volume percent, and a fiber filler present from between 20 to 40 volume percent. The formulation further includes between 5.7 to 26.4 volume percent of glass microspheres, where the glass microspheres are surface treated to covalently bond to the thermoset cross-linkable polyester or vinyl polymeric resin.

An improved molded article is provided that is produced from a molding composition formulation that includes a cured thermoset cross-linkable polyester or vinyl polymeric resin, and a fiber filler present from between 20 to 40 volume percent cross-linked to a polyurea present from between 0.6 and 8.4 volume percent.

BRIEF DESCRIPTION OF THE DRAWINGS

The present invention is further detailed with respect to the following drawings. These figures are not intended to limit the scope of the present invention but rather illustrate certain attributes thereof.

DESCRIPTION OF THE INVENTION

Figure 1A:
FIGS. 1A-ID are images of dynamic impact coupons of Control SMC 4 mm coupons tested at 5 ft/sec-14 pounds (FIG. 1A), Control SMC tested 4 mm coupons at 4 ft/sec-14 pounds (FIG. 1B), 1.5 mm thick aluminum tested at 5 ft/sec-14 pounds (FIG. 1C), and 1.5 mm thick aluminum tested at 4 ft/sec-14 pounds (FIG. 1D)

In accordance with the present invention, an isocyanate containing species and an amine containing species are introduced into the uncured polymeric resin of a sheet molding compound (SMC) under conditions suitable for the formation of a polyurea polymer network. Upon cure of the SMC base resin, an interpenetrating network is formed that is stronger than the base SMC absent the polyurea. As a result, an article is formed from an inventive SMC that is stronger at the same dimensions than a conventional article or thinned to achieve the same properties to obtain a lightweight article compared to that formed from conventional SMC. The properties of an inventive article are also attractive relative to aluminum for the formation of vehicle body and exterior panels.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive article reacts a subset of the isocyanate functionality present in a conventional SMC uncured formulation with an amine that has a functionality per molecule that averages between 2.2 and 3.6 amine groups per molecule. It has been discovered that for a given quantity of amine functionality outside that range fails to impart the desired increase in strength below the range, while above this range, the resulting article is unworkable and somewhat brittle.

An inventive article is characterized by a higher tensile strength and greater elongation than a conventional article, as well as a lower Young's modulus. A stronger part can be exploited by making the part thinner to save weight. Through the addition of hollow glass microspheres a still lighter article is formed that is readily exploited in to form components of land vehicles, in aerospace, wind turbines, and marine settings. Mass production land vehicle body and exterior parts formed according to the present invention offer manufacturing, weight savings, and durability improvements relative to both conventional SMC and aluminum.

As detailed herein, volume percent is measured based on a fully formulation SMC composition inclusive of fillers and additives prior to cure. It is appreciated that volume percent and weight percent are readily interchanged using the density of a given component. Additionally, as the dimensional change upon cure is typically less than 1% linear percent, volume percent is also readily calculated from cured articles.

As detailed herein, polymer molecular weight is molar molecular mass.

According to the present invention, a fully formulated SMC composition is 20 to 40 volume percent fiber content. The fiber being glass only, carbon only, a mixture of glass with at least one of carbon fiber or cellulosic fiber or a mixture of mixture of carbon with at least one of glass fiber or cellulosic fiber. Cellulosic fiber illustratively including hemp, sisal, cane, bamboo, jute, straw, silk, straw, palm frond, coconut husk, coconut fiber; and combinations thereof. Typical lengths of filler fibers used in the present invention typically range from 0.5 to 5 centimeters (cm). It is appreciated that continuous, direction use of such filler fibers are also operative in the current invention. The diameters of filler fibers are appreciated to vary widely based on commercial sources with glass filler fibers having typical diameters of 0.03 to 0.5 millimeters (mm); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention. It is also appreciated that cellulosic fibers of natural origin are readily treated to enhance bonding to the SMC matrix, such treatments are detailed in U.S. Pat. Pub. 2014/0329964.

The polyurea polymer is formed in situ in the uncured SMC formulation in an amount of between 0.6 and 8.4 volume percent. In some embodiments the polyurea is present from between 7.3 and 8.0 volume percent and this corresponds to between 5.4 and 7.35 weight percent of the formulation with the range extrema corresponding to 20 and 40 volume percent fibers, respectively. The polyurea volume percent being composed of between 6 and 22 percent of the aforementioned volumetric amounts being the amine, with the remainder being the polyisocyanate. In contrast to the prior art of U.S. Pat. No. 7,829,637 B2, considerably greater amounts to amine are present to form a strength imparting interpenetrating network to the resultant cured article.

Amines operative in the present invention illustratively include a triamine alone, or a mixture of diamines or triamines with higher functionality polyamines to achieve an average molecular amine functionality of between 2.2 and 3.6. Diamines operative herein illustratively include $C_2$-$C_{24}$ linear aliphatic diamines, $C_2$-$C_{24}$ branched aliphatic diamines, oligopeptides containing at least one amidic amino acid of asparagine, arginine, histidine, lysine or glutamine; and aryl diamines and polymer backbones having the amines extending therefrom; and triamines such as aliphatic alkylene oxide triamines; oligopeptides as detailed above; and polyamines with 4 or more amine groups reactive with isocyanates illustratively include tetramethylethylenediamine and the aforementioned oligopeptides. In some embodiments, the amines include aliphatic alkylene oxide amines that are polyoxyalkylene diamines and triamines, synonymously detailed herein as polyether amines. Specific amines operative herein include iso-octyl amine; 1,12 dodecadiamine; diethyl toluene diamine; polyoxypropylene diamine (PPD); and polyoxypropylenetriamine (PPT) having a molecular weight of from 200 to 5,000, with 200 to 600 being used in specific embodiments. An amine component operative herein has a molecular weight of between 120 and 5,000 Daltons. A triamine or higher amine of the present invention has a molecular weight of 200 to 600. In some embodiments of the mixed amines, the diamine of the present invention has a lower molecular weight of between 200 and 2,500 Daltons and the triamine has a higher relative molecular weight of between 200 and 5,000 Daltons. It is appreciated that a triamine present in combination with a diamine will provide branched polyureas provided the interpenetrating network needed to impart strength to the resulting article.

An isocyanate operative in the present invention illustratively includes hexamethylene-1-isocyanate, 2,2,4-trimethylhexamethylene-1-isocyanate; alicyclic isocyanates such as cyclohexane isocyanate, dicyclohexylmethane-4-isocyanate, aryl isocyanates such as toluene-2-isocyanate, naphthylene-1-isocyanate; polyisocyanates such as aliphatic polyisocyanates such as hexamethylene-1,6-diisocyanate, 2,2,4-trimethylhexamethylene-1,6-diisocyanate; alicyclic polyisocyanates such as cyclohexane-1,4-diisocyanate, dicyclohexylmethane-4,4'-diisocyanate, aryl polyisocyanates such as p-phenylene diisocyanate, toluene-2,4-isocyanate, and diphenyl methane 2,4'-diisocyanate. Additionally, an isocyanate operative herein includes polyphenylene polymethylene polyisocyanate derived from condensation of aniline and formalin, liquidified diphenylmethane diisocyanates containing carbodiimide groups or uretonimine groups, modified polyisocyanates containing at least one urethane group, allophanate group, biuret group or uretodione group. In some inventive embodiments, the isocyanates are modified polyisocyanates containing urethane groups, allophanate groups or uretodione groups such that the polyisocyanates are liquid at the ambient temperature such as 20° C.

A liquid polyisocyanate operative in the present invention is formed by reaction of an isocyanate as detailed herein with a polyether polyol, polyester polyol, or a diamine. The diamine used to form a liquid polyisocyanate is not to be confused with that used herein to form the interpenetrating network as having been reacted prior to addition of the liquid piolyisocyanate to the SMC formulation. The liquid polyisocyanate formed by reaction of an isocyanate with a diamine to yields an isocyanate terminated polyurea. The diamine having terminal amine groups and a molecular weight from 400 to 5,000. The polyol having terminal hydroxyl groups and a molecular weight from 400 to 5,000 Daltons. In some embodiments, the polyol is a condensation product of a $C_2$-$C_6$ alkylene oxide with a $C_2$-$C_8$ alkylene glycol. Specific $C_2$-$C_6$ alkylene oxides illustratively include ethylene oxide, and propylene oxide. Specific $C_2$-$C_8$ alkylene glycols illustratively include ethylene glycol, diethylene glycol, isopropylene glycol, propylene glycol, tetramethylene glycol, and hexamethylene glycol, and their condensation products. In other embodiments, the polyol is a hydroxyl functionality of between 2.0 and 2.8. In still other embodiments, the hydroxyl functionality is between 2.0 and 2.4 and the molecular weight is between 1,400 and 5,000 Daltons.

A liquid polyisocyanate containing urethane or urea linkages is formed under moisture-free conditions to inhibit reaction between isocyanate and water. A dry nitrogen, argon, or air blanket is suitable to inhibit the isocyanate and water reaction. Mixing the isocyanate with a suitable reaction catalyst and optionally a polymeric resin cross-linking monomer followed by heating and introduction of the polyol and or diamine is sufficient to form the polyisocyanate. Conventional reaction catalysts include organometallic compounds, tertiary amines, and other nitrogen bearing compounds. Catalysts are typically present from 0 to 3 weight percent of the total reaction mixture weight. Typical reaction temperatures range from 10 to 120° C. The cross-linking monomer component, when present, typically represents 0 to 80 weight percent of mixture. It is appreciated that a polymerization inhibitor is optionally included to preclude premature styrene polymerization or reaction with the reactants. Polymerization inhibitors include hydroquinones and t-butyl catechol. The NCO content of resulting polyisocyanate is determined according to ASTM D2572-97 and in some inventive embodiments, the free isocyanate of the resulting isocyanate terminated prepolymer is 6% to 33% and has functionality higher than 2.

An inventive SMC composition is formulated in certain inventive embodiments to include between 5.7 volume percent and 26.4 volume percent of hollow glass microspheres. The lower level of hollow glass microspheres corresponding to 40 volume percent fiber and the upper level corresponding to 20 volume percent fiber. A glass microsphere has a mean diameter of between 10 and 55 microns. In certain embodiments, the glass microspheres are monodisperse, while in other embodiments; the microsphere sizes extend between 5 and 200 microns. It is appreciated that glass microspheres with higher crush strength are less likely to be damaged by sheer mixing associated with SMC formulation and flow pressures. A 16-micron glass microsphere is exemplary of those used in the following examples. It is appreciated that glass microspheres can be surface modified to enhance strength as detailed in U.S. Pat. No. 7,700,670 B2 or U.S. Pat. Pub. 2015/0376398 A1. The aforementioned volume loading of glass microspheres correspond to 1.6 to 10 weight percent glass microspheres for conventional 16-micron diameter glass microspheres. It is appreciated that the inclusion of glass microspheres can reduce the density of a resulting article to below 1.6 grams/cubic centimeter (g/cc), below 1.4 g/cc, and even as low as 1.2 g/cc, with substantially reducing the strength of the resulting article.

Ethylenically unsaturated monomers operative herein illustratively include styrene, vinyl toluene, divinyl benzene, acrylic acid esters and methacrylic acid esters, such as methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallylcyanurate, vinyl acetate, vinyl propionate, vinyl ether, acrylonitrile, and the like. The ethylenically unsaturated monomer is a comparatively low viscosity compound compared to the polyurea and has at least one ethylenically unsaturated group which will react with itself or with ethylenic unsaturation within the SMC or BMC prepolymer resin by free radical activation. In commercially relevant embodiments, the base molding composition polymeric resin is dissolved in a monomer, and the monomer in which the isocyanate is dissolved is identical to that in which the base molding composition polymeric resin is dissolved.

An example of a commercially important polyisocyanate is a linear polyurethane having a 2.0-2.8 polyol and 2.0-2.8 isocyanate equivalency dissolved in styrene monomer, where the molecular weight ranges from 400 to 50,000 Daltons.

Conventional base SMC formulations that benefit from incorporation of inventive interpenetrating network is not critical. Base formulations suitable for incorporation of a base thickener are described in U.S. Pat. Nos. 4,260,538; 4,643,126; 5,100,935; 5,268,400; 5,854,317; 6,780,923; 7,524,547 B2; and U.S. Pat. Pub. 2007/0197694.

A principal component of an SMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites.

Vinyl ester resins are also typically employed in SMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers are those optionally mixed with the isocyanate component of the inventive thickener. Preferably, the base molding composition monomer and the optional monomer component in which the isocyanate component of an inventive thickener is mixed are identical. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

In some inventive embodiments, a quantity of an alkali earth oxide or hydroxide additive is present, as a thickener, albeit a hygroscopic one. Alkali earth oxide or hydroxide are known to thicken a polymeric resin prepolymer through chelation reaction between the alkali earth oxide or hydroxide and functional groups of the prepolymer and in particular terminal carboxylate functionality of an ethylenically unsaturated polyester prepolymer resin. However, ambient moisture is competitive with carboxylate functionality for reaction with the alkali earth oxide or hydroxide, as seen in the formulations of U.S. Pat. No. 4,067,845, thereby making those formulations vulnerable at higher loadings to seasonal humidity variations and at lower loadings incapable of achieving desired terminal and stable viscosities less than 60 million centipoise. An inventive formulation contains between 0.2 and 2 total weight percent of MgO, or a molar stoichiometric equivalent of $Mg(OH)_2$, CaO, or a combination thereof of the two alone, or with MgO. As with the lower levels of polyurea detailed in U.S. Pat. No. 7,829,637 B2; a humidity stability is imparted to SMC formulations inclusive to alkali earth oxides/hydroxides.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The SMC formulation in some inventive embodiments includes a particulate filler, distinct from the density reducing glass microspheres. Particulate fillers operative in such molding compositions illustratively include calcium carbonate, calcium silicate, alumina, silica, talcs, dolomite, vermiculite, diatomaceous earth, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent. Typical filler sizes are from 0.1 to 50 microns.

A mold release agent is typically provided to promote mold release. Mold releases include fatty acid salts illustratively including oleates, palmitates, stearates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

It is appreciated that the present invention optionally also incorporates additional additives illustratively including flame retardants, plasticizers, colorants, and other processing additives conventional to the art.

Molding compositions of the present invention are well suited for the rapid production of molded composite material of a variety of articles illustratively including bumper beams, automotive door intrusion beams, automotive door panel components, automotive hood and trunk lids, automotive load floor components, and pick-up boxes, and various industrial and consumer product housings.

The present invention is further illustrated with respect to the following non-limiting examples.

EXAMPLE CONTROL

A conventional sheet molding compound prototype formulation containing unsaturated polyester resin, thermoplastic additives, organic peroxides, inhibitor, filler, mold release, and pigment sold by Continental Structural Plastics under the trade name TCA® is used as a control throughout the following examples and loaded with chopped glass fiber coated with silane-based sizing chopped to 25.4 mm lengths and 15 microns in diameter in an amount detailed in Table 1.

Example 1

To the base formulation of the Example Control, a polyurea polymer is formed in situ in the uncured SMC formulation in an amount of between 8.0 volume percent with a change in volume percent of the same glass fibers as noted in Table 1. The polyurea volume percent being composed of 12 percent of the aforementioned volumetric amounts being the amine, with the remainder being the isocyanate. A polyurethane having an isocyanate function of 2.7 and molecular weight of 28,000 is used as an isocyanate source. 16-micron glass microspheres are present at 16 volume percent. The improvements in tensile strength, Young's modulus (decrease), elongation, density, and strain are noted in Table 1 compared to the Example Control.

Figure 1B:
Figure 1C:
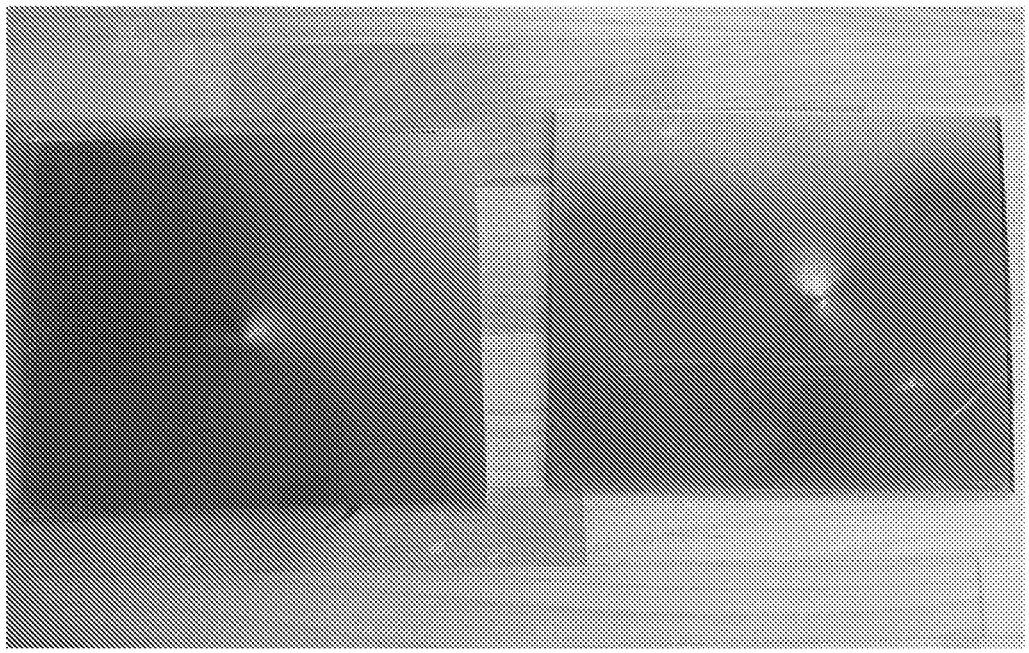
Figure 1D:
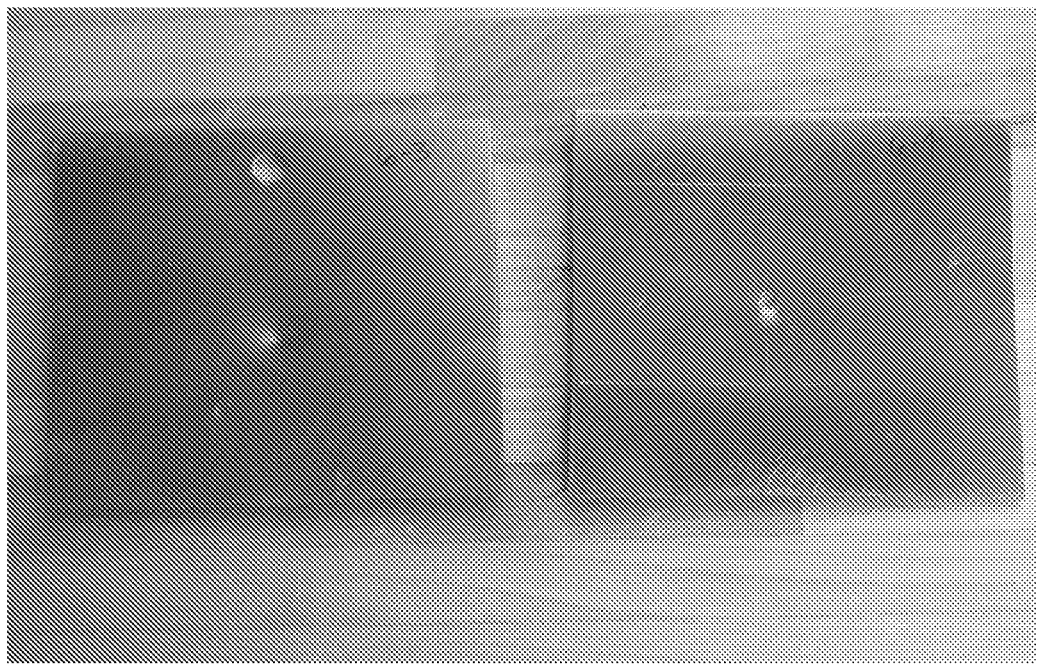
Figures 2A, 2B, 2C:
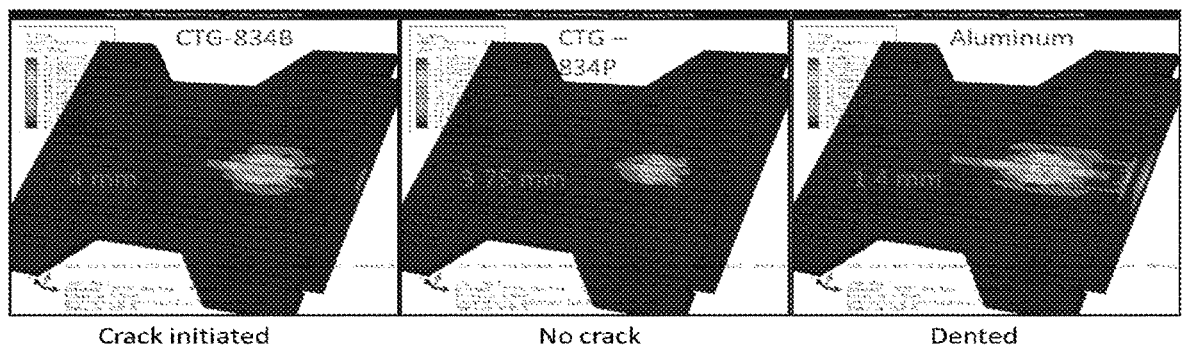
FIGS. 2A-2C illustrate computer aided engineering simulations of a weighted ball dead drop onto a pick-up truck box formed of Control SMC (FIG. 2A) at 4 mm thickness, an inventive SMC (FIG. 2B) at 3.5 mm thickness and aluminum (FIG. 2C) at 1.4 mm thickness, demonstrating the superior performance of the inventive SMC of FIG. 2B in dead drop testing.

Comparative Example A 6022 grade aluminum sheeting having a thickness of 1.5 mm is used as a comparative example in Table 1 and FIGS. 1C and 1D, and FIG. 2C as a competitive material for many of the applications served by the present invention.

Example 2

Coupons of the Example Control and Example 1 are cured to a thickness of 4 mm and tested by impact with a 14-pound weight at speeds of 5 feet/second (1.52 meters/second) or 4 feet/second (1.22 meters/second). The Example Controls coupons are shown in FIGS. 1A and 1B, respectively with limited backside dimple forming. Coupons per Examples 1 functioned like those of Example Controls. In contrast, aluminum coupons show dimpling at both impact velocities, as shown in FIGS. 1C and 1D, respectively.

Example 3

Computer aided engineering simulations are conducted on the materials produced according to the Example Control, Example 1 and the Comparative Example in the form of a pick-up box have the thicknesses of 4 mm and 3.5 mm and the properties from the above examples to simulate a 14-pound (6.3 kg) bowling ball impacting the pick-up bead at 5 feet/second (1.52 meters/second) with the proviso that Comparative Example A was simulated at 1.4 mm instead of 1.5 mm. The results are shown in FIGS. 2A-2C, respectively, with the Example Control cracking, and the Aluminum denting. In contrast, no cracking is simulated in the box of Example 1 with limited denting relative to the aluminum Comparative Example.

Example 4

The material of Example 1 is reformulated with Owens Corning 905AB glass that is like-chopped in place of the glass per the Example Control. The resulting coupons formed in the same way have the properties detailed in Table 1 of the inventive formulation.

Example 5

The material of Example 1 is reformulated with Owens Corning 905AB glass chopped in place of the glass per the Example Control. The resulting coupons formed in the same way have the properties detailed in Table 1 of the inventive formulation.

Example 6

The material of Example 1 is reformulated with an equal volume mixture of glass fibers per the Example Control and 7-micron diameter carbon fibers at 40 volume percent of the SMC composition and at a length of 25.4 mm and no glass microspheres present. The resulting coupons formed in the same way have the properties detailed in Table 1 of the inventive formulation.

Example 7

The material of Example 1 is reformulated with only 20 volume percent glass, 26.4 volume percent 16-micron glass microspheres and the upper extrema value of polyurea with a slight decrease in properties below that for Example 1, but still superior to that of the Comparative Example 1.

Comparative Example B

The material of Example 1 is reformulated with only 18 volume percent glass and 28 volume percent with glass microspheres and 10% volume beyond the upper extrema value of inventive polyurea. The resulting material is unprocessible.

Comparative Example C

The material of Example 1 is reformulated with only 42 volume percent glass and 6 volume percent with glass microspheres and 10% volume below the lower extrema value of inventive polyurea. The resulting material is unprocessible.

TABLE 1

Table of properties for inventive formulations relative to Control Example and aluminum Comparative Example.

|  | Glass Type | Resin Pkg | Tensile Strength MPa | Young's Modulus MPa | Elongation % | Fiber % wt | Fiber vol. % | Density | % wt. saving vs. control density of 1.69 | Max. Log. Strain | Max. Deflection (mm) |
|---|---|---|---|---|---|---|---|---|---|---|---|
| Control | Silane sizing | Control | 152 | 13,289 | 1.61 | 48.6 | 31 | 1.69 | 0.00% | 0.04 | 7.2 |
| Ex. 1 | Silane sizing | +polyurea | 172.1 | 11,770 | 2.08 | 53.9 | 29.7 | 1.43 | 40.50% | 0.02 | 9 |
| Ex. 4 | OC 905 | +polyurea | 178.5 | 11,156 | 2.07 | 54.6 | 33.2 | 1.48 | 42.60% | 0.02 | 9.8 |
| Ex. 5 | OC 905 | +polyurea | 163.3 | 10,861 | 2.01 | 51.3 | 32.1 | 1.43 | 38.80% | 0.05 | 10.8 |
| Ex. 6 | Glass/carbon fiber | +polyurea | 217 | 21,666 | 1.15 | 53.7 | 40 | 1.55 | 43.80% | 0.02 | 9.3 |
| Comp. Ex. A | Aluminum 6022 # | Not applicable | 137 | 70,000 | 26 | N.A. |  | 2.7 |  |  |  |

References recited herein are indicative of the level of skill in the art to which the invention pertains. These references are hereby incorporated by reference to the same extent as if each individual reference was explicitly and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A sheet molding composition formulation comprising:
   a thermoset cross-linkable polyester or vinyl polymeric resin;
   a polyurea present from between 0.6 and 8.4 volume percent based on the sheet molding composition formulation, said polyurea being composed of between 6 and 22 percent by volume amine, with the remainder being polyisocyanate, where the amount of amine is based on the volume of polyurea, where the amine has an average molecular amine functionality of between 2.2 and 3.6, where the amine comprises triamine alone or a mixture of diamines or triamines with higher functionality polyamines, and wherein upon curing of the sheet molding composition formulation said polyurea forms a strength imparting interpenetrating network;
a fiber filler present from 20 to 40 volume percent;
glass microspheres present from 5.7 to 26.4 volume percent.

2. The formulation of claim 1 wherein said glass microspheres are surface treated to covalently bond to said thermoset cross-linkable polyester or vinyl polymeric resin.

3. The formulation of claim 1 wherein said glass microspheres have a diameter of from 12 to 55 microns.

4. The formulation of claim 1 wherein said glass microspheres have a diameter of from 12 to 45 microns.

5. The formulation of claim 1 wherein said glass microspheres have a diameter of 16 microns.

6. The formulation of claim 1 further comprising a thickener additive is magnesium oxide, magnesium hydroxide, calcium oxide or a combination thereof.

7. The formulation of claim 1 wherein said mixture of amines has a molecular weight of between 120 and 5,000 Daltons and has a polyether backbone.

8. The formulation of claim 1 wherein said polyisocyanate isocyanate is a diisocyanate.

9. The formulation of claim 1 wherein said polyisocyanate is an isocyanate-terminated polyurethane.

10. The formulation of claim 1 wherein said polyisocyanate has a molecular weight of between 400 and 5,000 and a component selected from the group consisting of: a polyether polyol, a polyester polyol, and a diamine.

11. An improved molded article produced from a molding composition formulation that includes a cured thermoset cross-linkable polyester or vinyl polymeric resin, and a fiber filler present from 20 to 40 volume percent cross-linked to said polyurea, wherein the improvement lies in: a polyurea present from 0.6 and 8.4 volume percent based on the sheet molding composition formulation, said polyurea being composed of between 6 and 22 percent by volume amine, with the remainder being polyisocyanate, where the amount of amine is based on the volume of polyurea, where the amine has an average molecular amine functionality of between 2.2 and 3.6, where the amine comprises triamine alone or a mixture of diamines or triamines with higher functionality polyamines, and wherein upon curing of the sheet molding composition formulation said polyurea forms a strength imparting interpenetrating network;
glass microspheres present from 16 to 26 volume percent.

12. The improved article of claim 11 wherein said glass microspheres are surface treated to covalently bond to said thermoset cross-linkable polyester or vinyl polymeric resin.

13. The improved article of claim 11 wherein said glass microspheres have a diameter of from 12 to 55 microns.

14. The improved article of claim 11 having a density of 1.43 to 1.6 grams/cubic centimeter (g/cc).

15. A sheet molding composition formulation comprising:
a thermoset cross-linkable polyester or vinyl polymeric resin;
a polyurea present from 0.6 and 8.4 volume percent based on the sheet molding composition formulation, said polyurea being composed of between 6 and 22 percent by volume amine, with the remainder being polyisocyanate, where the amount of amine is based on the volume of polyurea, where the amine has an average molecular amine functionality of between 2.2 and 3.6, where the amine comprises triamine alone or a mixture of diamines or triamines with higher functionality polyamines wherein upon curing of the sheet molding composition formulation said polyurea forms a strength imparting interpenetrating network;
a fiber filler present from 20 to 40 volume percent;
glass microspheres present from 16 to 26 volume percent, said glass microspheres being surface treated to covalently bond to said thermoset cross-linkable polyester or vinyl polymeric resin, and having a diameter of from 12 to 55 microns;
wherein upon curing said formulation has a density of 1.43 to 1.6 grams/cubic centimeter (g/cc).

* * * * *